Patented Nov. 24, 1953

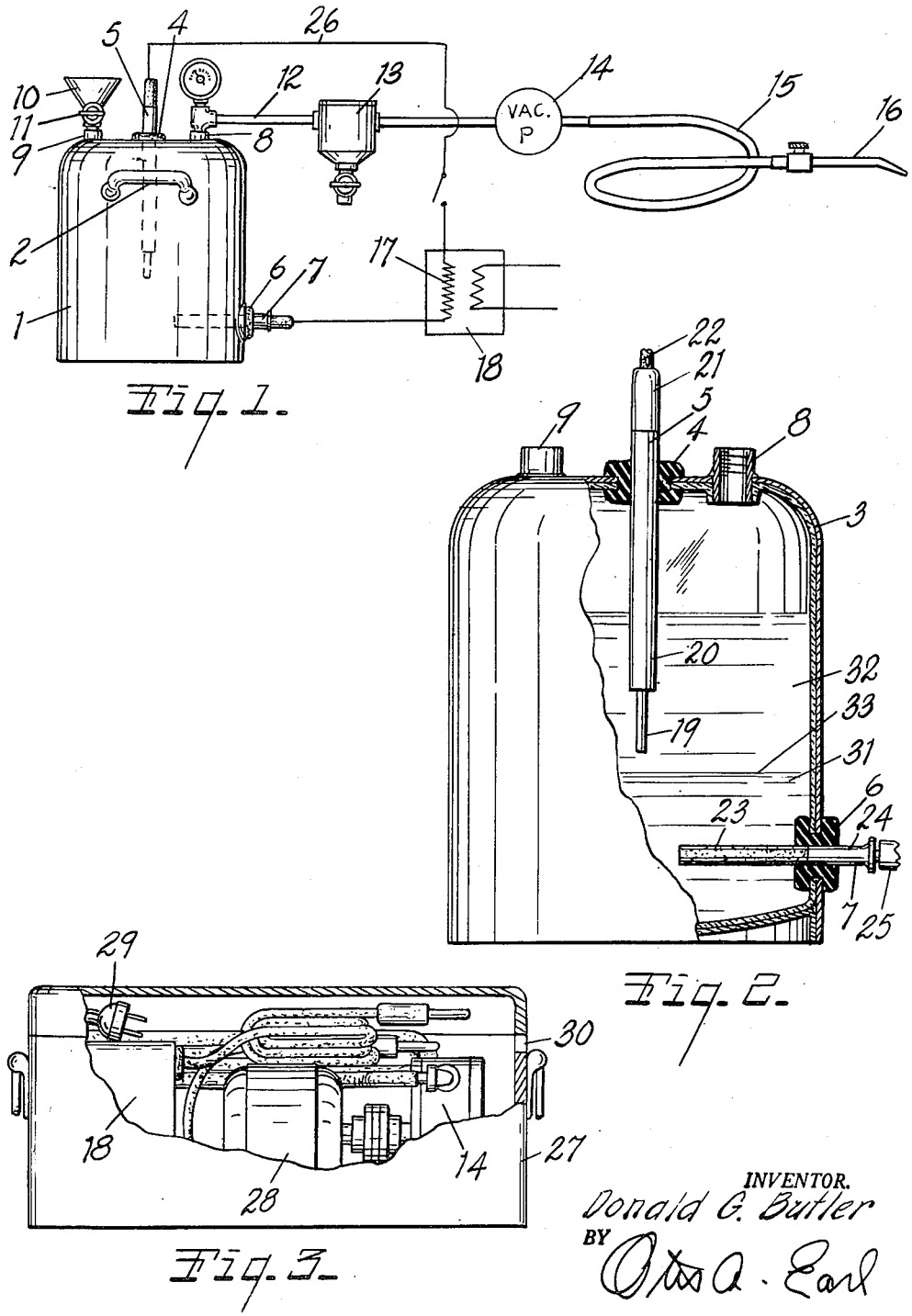

2,660,556

UNITED STATES PATENT OFFICE 2,660,556

ELECTRIC ARC PRODUCTION OF COMBUSTIBLE GASES

Donald G. Butler, Millersburg, Ohio

Application September 8, 1952, Serial No. 308,498

9 Claims. (Cl. 204—171)

This invention relates to improvements in electric arc production of combustible gases.

The principal objects of this invention are:

First, to provide an economical method for producing a combustible gas that is clean and which has reducing properties which permit the gas to be used in welding aluminum.

Second, to provide a method and apparatus for producing combustible gas which method and apparatus are adapted for portable use.

Third, to provide a novel apparatus for producing a mixture of hydrogen and acetylene gases from a hydrocarbon such as kerosene which apparatus can be carried to the work as distinguished from a stationary gas producing apparatus.

Fourth, to provide a novel method for producing a gas that burns with an extremely hot and clean flame when combined with atmospheric air.

Other objects and advantages of the invention will be apparent from a consideration of the following description and claims. The drawings of which there is one sheet illustrate a practical apparatus for producing the gas and practicing the method of the invention.

Fig. 1 is an elevational view of the gas producing apparatus, portions of the electrical elements of the apparatus being conventionally illustrated.

Fig. 2 is an enlarged elevational view of the main gas producing tank with the tank partially broken away in vertical cross section.

Fig. 3 is an elevational view partially broken away in cross section of a chest and enclosed auxiliary equipment for use with the tank shown at Fig. 2.

This invention relates to a convenient and inexpensive method and apparatus for producing a combustible gas from light hydrocarbon liquids such as kerosene. The gas produced is a mixture of hydrogen, acetylene, and other hydrocarbon that is readily combustible with a clean hot flame. The gas is produced by creating an electric arc through a body of the hydrocarbon liquid and the arc is maintained in efficient manner by materials mixed in the hydrocarbon and in a body of liquid which forms the terminal or one side of the arc as will be described.

The apparatus for carrying on the method consists primarily of a tank or generator that is desirably made in relatively small size to be readily portable. The tank 1 is provided with handles 2 and is lined as at 3 with a layer of glass or other electrically insulating material. The top of the tank is provided with an opening partially closed by the rubber grommet 4 for receiving the upper electrode 5. The side wall of the tank near the bottom thereof is provided with another opening in which the rubber grommet 6 is positioned for sealingly receiving a second or lower electrode 7. An outlet connection from the top of the tank is indicated at 8 and a filler opening 9 is also provided through which the ingredients of the process can be introduced into the tank through a funnel 10 having a valve 11.

The outlet connection 8 is adapted to be connected by suitable piping 12 to a liquid separator 13 and the dried gases issuing from the separator 13 are conducted to a pump 14 which functions to decrease the pressure within the tank and also to deliver the gas at increased pressure through a flexible tube 15 to the burner tip or nozzle 16.

The electrodes 5 and 7 are adapted to be energized at a high potential from the secondary 17 of a transformer 18. The upper electrode 5 includes an inner metallic core 19 surrounded throughout its upper portion by an insulating sleeve 20. The upper end of the sleeve 20 forms a socket for releasably receiving a plug 21 on a flexible conductor 22. The lower electrode 7 includes an inner rod-like portion of carbon 23 that is carried in a metal sleeve 24. The sleeve 24 also forms a socket for receiving the plug 25 on the end of a second flexible conduit 26.

As is illustrated in Fig. 3 the transformer 18 and pump 14 may be conveniently housed in a carrying case 27. A motor for operating a pump 14 is indicated at 28 and a supply line or cord 29 for connecting the transformer to a source of alternating current is housed in the case. The flexible electrical conduits from the transformer 18 can extend through an opening 30 in the side of the box to the appropriate sockets on the electrodes 5 and 7. The gas conducting conduits from the pump 14 to the separator and the nozzle 16 can also be housed within the case and extend through the opening 30.

The method by which the foregoing apparatus is utilized to produce a combustible gas is as follows:

A quantity of water is introduced into the bottom of the tank around the carbon electrode 23 as at 31. An additional quantity of number one grade of kerosene or a similar light hydrocarbon liquid is floated on top of the water as at 32. The kerosene surrounds the bared end 19 of the upper electrode and floats upon the water as at 33. Note that the upper electrode 5 is adjustable in the grommet 4 to bring the bare electrode 19 into close proximity with the surface of the water 33.

Dissolved in the water 31 is a small amount of sodium hydroxide or potassium hydroxide and a slightly larger amount of aluminum chloride. Also dissolved in the water 31 is a quantity of a detergent such as is commonly sold as a household washing product.

A satisfactory amount of the ingredients in the water 31 is 1 gram of the hydroxide and 1 gram of the detergent with 6 grams of the aluminum chloride to a liter of water. These amounts may be varied considerably and other metallic hydroxides such as potassium hydroxide may be substituted for the sodium hydroxide. The hydroxide functions to make the water electrically conductive while the aluminum chloride acts as a catalyst to assist the cracking action. The detergent acts to hold in suspension in the water small particles of carbon that are formed by the cracking process as will be described.

The kerosene has mixed therein 6 to 7 grams of finely powdered manganese dioxide. This manganese dioxide sinks to the surface of the water and acts as a further catalyst in assisting the cracking action of the arc.

The voltage applied across the electrodes is desirably in the neighborhood of 7000 volts and is at least 3000 volts. Direct current has advantages over alternating current but since it is easier to obtain the high voltage with alternating current this alternating current has been found to be satisfactory.

After the tank 1 has been charged as described, the contents are agitated by sharply shaking the tank 1 or 3 times to assure that the manganese dioxide is intermixed in the kerosene. The voltage is then applied to the electrodes to create the electric arc within the body of kerosene. The gas created by the arc is drawn off and the interior of the tank is maintained at approximately atmospheric pressure for about 30 minutes. This initial break-in operation of the apparatus causes finely divided carbon to be precipitated into both the kerosene and the water and increases the rate of gas generation. After the carbon content has built up in the liquids, the tank is closed except for the outlet pipe 12 and a vacuum of between 5 and 40 millimeters of mercury is drawn on the tank while the gas is being withdrawn. It has been found that less of the residual carbon is formed under low pressure and also that the gas produced has a higher acetylene content and burns with a hotter flame. The gas is, of course, delivered from the pump 14 to the burner tip 16 for use as desired. As was previously pointed out, the gas burns in air with a clean, hot flame that is superior generally to commercial acetylene and approximately equal in heating properties to purified acetylene.

The method and apparatus may be employed continuously with periodic replenishing of the kerosene. After a shutdown of the apparatus, the tank should be agitated to release the manganese dioxide particles prior to restarting the process. The process can then be continued at low pressure as set forth above. At long intervals it may be found desirable to replenish the tank with small amounts of the catalyst, detergent and water. After long periods of operation, the ingredients in the tank may become overly charged with precipitated carbon and the rate of gas production will fall off. At this time the tank should be emptied and recharged with fresh ingredients and the system should be again operated through the 30 minute break in period.

Having thus described my invention, what I claim as new and desire to secure by Letters Patent is:

1. The method of producing an inflammable gas which comprises the steps of floating a mixture of kerosene and finely divided manganese dioxide in the proportions of 3.25 grams of the dioxide to 1 liter of the kerosene on a solution of water, aluminum chloride, sodium hydroxide and a detergent in the proportions of 6 grams of the chloride, 1 gram of the hydroxide and 13 grams of the detergent to one liter of water, the two liquids being retained in an electrically insulating tank, electrifying the water solution by a carbon electrode immersed therein, immersing a metal electrode in said kerosene to near the level of the water, agitating the mixtures initially to intermix the dioxide with the kerosene, applying an alternating voltage of about 7000 volts between said electrodes to create an arc from said metal electrode to said water, withdrawing combustible gases created by the arc for approximately 30 minutes at substantially atmospheric pressure, subsequently reducing the pressure on said liquids to a vacuum of between 5 to 40 millimeters of mercury while continuing to maintain the arc and to withdraw gas, and conducting the gas thus formed through a liquid separator to a burner.

2. The method of producing an inflammable gas which comprises the steps of floating a mixture of kerosene and finely divided manganese dioxide on a solution of water, aluminum chloride, sodium hydroxide and a detergent, the two liquids being retained in an electrically insulating tank, electrifying the water solution by a carbon electrode immersed therein, immersing a metal electrode in said kerosene to near the level of the water, agitating the mixtures initially to intermix the dioxide with the kerosene, applying an alternating voltage of about 7000 volts between said electrodes to create an arc from said metal electrode to said water, withdrawing combustible gases created by the arc for approximately 30 minutes at substantially atmospheric pressure, subsequently reducing the pressure on said liquids to a vacuum of between 5 to 40 millimeters of mercury while continuing to maintain the arc and to withdraw gas, and conducting the gas thus formed to a burner.

3. The method of producing an inflammable gas which comprises the steps of floating a mixture of kerosene and finely divided manganese dioxide in the proportions of 3.25 grams of the dioxide to 1 liter of the kerosene on a solution of water, aluminum chloride, sodium hydroxide and a detergent in the proportions of 6 grams of the chloride, 1 gram of the hydroxide and 13 grams of the detergent to one liter of water, the two liquids being retained in an electrically insulating tank, electrifying the water solution by an electrode immersed therein, immersing an electrode in said kerosene to near the level of the water, agitating the mixtures initially to intermix the dioxide with the kerosene, applying an alternating voltage in excess of 3000 volts between said electrodes to create an arc from the upper electrode to said water, withdrawing combustible gases created by the arc for approximately 30 minutes at substantially atmospheric pressure, subsequently reducing the pressure on said liquids to a vacuum of between 5 to 40 millimeters of mercury while continuing to maintain the arc and to withdraw gas, and conducting the gas thus formed to a burner.

4. The method of producing an inflammable gas which comprises the steps of floating a mixture of kerosene and finely divided manganese dioxide in the proportions of 3.25 grams of the dioxide to 1 liter of the kerosene on a solution of water, aluminum chloride, sodium hydroxide and a detergent in the proportions of 6 grams of the chloride, 1 gram of the hydroxide and 13 grams of the detergent to 1 liter of water, the two liquids being retained in an electrically insulating tank, electrifying the water solution by an electrode immersed therein, immersing an electrode in said kerosene to near the level of the water, applying an alternating voltage in excess of 3000 volts between said electrodes to create an arc from the upper electrode to said water, withdrawing combustible gases created by the arc, reducing the pressure on said liquids to a vacuum of between 5 to 40 millimeters of mercury while continuing to maintain the arc and to withdraw gas, and conducting the gas thus formed to a burner.

5. The method of producing an inflammable gas which comprises the steps of floating a mixture of kerosene and finely divided manganese dioxide on a solution of water, aluminum chloride, metallic hydroxide and a detergent, the two liquids being retained in an electrically insulating tank, electrifying the water solution by an electrode immersed therein, immersing a second electrode in said kerosene to near the level of the water, agitating the mixtures initially to intermix the dioxide with the kerosene, applying voltage in excess of 3000 volts between said electrodes to create an arc from said second electrode to said water, withdrawing combustible gases created by the arc for approximately 30 minutes at substantially atmospheric pressure, subsequently reducing the pressure on said liquids to a vacuum of between 5 to 40 millimeters of mercury while continuing to maintain the arc and to withdraw gas, and conducting the gas thus formed to a burner.

6. The method of producing an inflammable gas which comprises the steps of floating a mixture of kerosene and finely divided manganese dioxide on a solution of water, aluminum chloride, metallic hydroxide and a detergent, the two liquids being retained in an electrically insulating tank, electrifying the water solution by an electrode immersed therein, immersing a second electrode in said kerosene to near the level of the water, applying voltage in excess of 3000 volts between said electrodes to create an arc from said second electrode to said water, withdrawing combustible gases created by the arc, reducing the pressure on said liquids to substantially below atmospheric pressure while continuing to maintain the arc and to withdraw gas, and conducting the gas thus formed to a burner.

7. The method of producing an inflammable gas which comprises the steps of floating a mixture of kerosene and finely divided manganese dioxide in the proportions of 3.25 grams of the dioxide to 1 liter of the kerosene on a solution of water, aluminum chloride, potassium hydroxide and a detergent in the proportions of 6 grams of the chloride, 1 gram of the hydroxide and 13 grams of the detergent to 1 liter of water, the two liquids being retained in an electrically insulating tank, electrifying the water solution by an electrode immersed therein, immersing a second electrode in said kerosene to near the level of the water, agitating the mixtures initially to intermix the dioxide with the kerosene, applying voltage in excess of 3000 volts between said electrodes to create an arc from said second electrode to said water, withdrawing combustible gases created by the arc thus formed through a liquid separator to a burner.

8. The method of producing an inflammable gas which comprises the steps of floating a mixture of kerosene and finely divided manganese dioxide in the proportions of 3.25 grams of the dioxide to 1 liter of the kerosene on a solution of water, aluminum chloride, potassium hydroxide and a detergent in the proportions of 6 grams of the chloride, 1 gram of the hydroxide and 13 grams of the detergent to 1 liter of water, the two liquids being retained in an electrically insulating tank, electrifying the water solution by an electrode immersed therein, immersing a second electrode in said kerosene to near the level of the water, applying voltage in excess of 3000 volts between said electrodes to create an arc from said second electrode to said water, withdrawing combustible gases created by the arc and conducting the gas thus formed to a burner.

9. The method of producing an inflammable gas which comprises the steps of floating a mixture of kerosene and finely divided manganese dioxide on a solution of water, aluminum chloride, metallic hydroxide and a detergent, the two liquids being retained in an electrically insulating tank, electrifying the water solution by an electrode immersed therein, immersing a second electrode in said kerosene to near the level of the water, applying voltage in excess of 3000 volts between said electrodes to create an arc from said second electrode to said water, withdrawing combustible gases created by the arc and conducting the gas thus formed to a burner.

DONALD G. BUTLER.

References Cited in the file of this patent

UNITED STATES PATENTS

| Number | Name | Date |
|---|---|---|
| 1,282,445 | McKee | Oct. 22, 1918 |
| 2,013,996 | Baumann et al. | Sept. 10, 1935 |
| 2,353,770 | Suits | July 18, 1944 |